United States Patent
Kato et al.

(10) Patent No.: US 11,156,986 B2
(45) Date of Patent: Oct. 26, 2021

(54) MACHINING PROGRAM EDITING DEVICE

(71) Applicant: FANUC Corporation, Yamanashi (JP)

(72) Inventors: Tomokazu Kato, Yamanashi (JP); Kazuo Sato, Yamanashi (JP); Yorikazu Fukui, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 148 days.

(21) Appl. No.: 16/360,566

(22) Filed: Mar. 21, 2019

(65) Prior Publication Data

US 2019/0294152 A1    Sep. 26, 2019

(30) Foreign Application Priority Data

Mar. 22, 2018 (JP) .............................. JP2018-054594

(51) Int. Cl.
*G05B 19/418* (2006.01)
*G05B 19/4155* (2006.01)

(52) U.S. Cl.
CPC ... *G05B 19/4155* (2013.01); *G05B 19/41865* (2013.01); *G05B 2219/31407* (2013.01); *G05B 2219/31429* (2013.01); *G05B 2219/36219* (2013.01)

(58) Field of Classification Search
CPC .......... G05B 19/4155; G05B 19/41865; G05B 2219/31407; G05B 2219/31429; G05B 2219/36219
See application file for complete search history.

(56) References Cited

U.S. PATENT DOCUMENTS

| 2010/0063608 | A1* | 3/2010 | Miller ................. G05B 19/409 700/97 |
| 2012/0109359 | A1 | 5/2012 | Mizuno et al. |
| 2015/0253760 | A1* | 9/2015 | Tateno ............... G05B 19/4097 700/83 |
| 2016/0026167 | A1* | 1/2016 | Yamada ........... G05B 19/41865 700/174 |
| 2016/0109877 | A1 | 4/2016 | Ishiwari et al. |
| 2017/0329312 | A1 | 11/2017 | Ishiwari |

FOREIGN PATENT DOCUMENTS

| JP | H1312605 A | 12/1989 |
| JP | H7-311612 A | 11/1995 |
| JP | 2003248507 A | 9/2003 |
| JP | 2012-93975 A | 5/2012 |
| JP | 2015179506 A | 10/2015 |
| JP | 201678207 A | 5/2016 |
| JP | 2016164721 A | 9/2016 |
| JP | 2017-207823 A | 11/2017 |

* cited by examiner

*Primary Examiner* — Thomas C Lee
*Assistant Examiner* — Gary Collins
(74) *Attorney, Agent, or Firm* — Hauptman Ham, LLP

(57) ABSTRACT

A machining program editing device calculates an editable time for a block of a machining program, makes editable only those of a plurality of blocks in the machining program which have the editable time left remaining, and locally writes only edited portions into a machining program used for control.

4 Claims, 4 Drawing Sheets

FIG. 3

| BLOCK | BLOCK NO. | MAXIMUM NUMBER OF LOOK-AHEAD BLOCKS | MACHINING TIME (s) |
|---|---|---|---|
| ~ | | | |
| N060··· ···; | 6 | 10 | 1.0 |
| N070··· ···; | 7 | 10 | 2.0 |
| N080··· ···; | 8 | 10 | 1.0 |
| N090··· ···; | 9 | 10 | 2.0 |
| N100··· ···; | 10 | 10 | 0 |
| N110··· ···; | 11 | 10 | 0.5 |
| N120··· ···; | 12 | 10 | 0.5 |
| N130··· ···; | 13 | 10 | 0.7 |
| N140··· ···; | 14 | 10 | 0.1 |
| N150··· ···; | 15 | 10 | 0.2 |
| N160··· ···; | 16 | 10 | 0.2 |
| N170··· ···; | 17 | 10 | 0.2 |
| N180··· ···; | 18 | 10 | 0.5 |
| N190··· ···; | 19 | 10 | 0.2 |
| N200··· ···; | 20 | 10 | 0.3 |
| ~ | | | |

FIG. 4

| BLOCK | BLOCK NO. | MAXIMUM NUMBER OF LOOK-AHEAD BLOCKS | MACHINING TIME (s) |
|---|---|---|---|
| ~ | | | |
| N060⋯ ⋯; | 6 | 10 | 1.0 |
| N070⋯ ⋯; | 7 | 10 | 2.0 |
| N080⋯ ⋯; | 8 | 10 | 1.0 |
| N090⋯ ⋯; | 9 | 10 | 2.0 |
| N100⋯ ⋯; | 10 | 10 | 0 |
| ~ | | | |
| ~ | | | |
| N760⋯ ⋯; | 76 | 10 | 0.5 |
| N770⋯ ⋯; | 77 | 10 | 0.5 |
| N780⋯ ⋯; | 78 | (10) | 0.7 |
| N790⋯ ⋯; | 79 | 10 | 0.1 |
| N800⋯ ⋯; | 80 | 10 | 0.2 |
| N810⋯ ⋯; | 81 | 10 | 0.2 |
| N820⋯ ⋯; | 82 | 10 | 0.2 |
| N830⋯ ⋯; | 83 | 10 | 0.5 |
| N840⋯ ⋯; | 84 | 10 | 0.2 |
| N850⋯ ⋯; | 85 | 10 | 0.4 |
| N860⋯ ⋯; | 86 | 10 | 0.5 |
| N870⋯ ⋯; | 87 | 10 | 0.4 |
| N880⋯ ⋯; | 88 | 10 | 0.5 |
| N890⋯ ⋯; | 89 | 10 | 0.5 |
| N900⋯ ⋯; | 90 | 10 | 0.5 |
| N910⋯ ⋯; | 91 | 10 | 0.5 |
| ~ | | | |

BLOCK BEING EXECUTED →

RANGE IN WHICH MACHINING TIME IS SUMMED UP

RANGE BUFFERED WHEN EDITED BLOCK IS REACHED BY BEGINNING OF READOUT (MAXIMUM NUMBER OF LOOK-AHEAD BLOCKS FOR N780: 10)

SPECIFIED BLOCK →

MACHINING PROGRAM EDITING DEVICE

RELATED APPLICATIONS

The present application claims priority of Japanese Application Number 2018-054594, filed Mar. 22, 2018, the disclosure of which is hereby incorporated by reference herein in its entirety.

BACKGROUND OF THE INVENTION

Field of the Invention

The present invention relates to a machining program editing device, and more particularly, to a machining program editing device capable of editing a machining program currently being executed.

Description of the Related Art

A numerical controller performs numerical control processing based on a machining program and controls a machine tool based on the result of this processing to machine a workpiece as commanded. In machining the workpiece based on the machining program, workers used to adjust machining conditions, such as the spindle speed and feed rate, while performing trial machining in the machining program so that the machined workpiece reaches a target machined state, and to cause the result of the adjustment to be reflected in the machining program. Moreover, such a method is adopted that if an error is found in the machining program during a machining operation based on the machining program, the operation of the machining program is resumed after suspending the machining operation and correcting the machining program (see Japanese Patent Application Laid-Open No. 07-311612).

If the machining program is enabled to be edited without suspending the machining operation during the same and the result of the editing is caused to be immediately reflected in the operation, there is no loss time due to suspension of the machining operation in such a case as described above, so that tasks can be performed efficiently. However, a typical numerical controller cannot edit the machining program during the machining operation. This is because if a control unit of the numerical controller reads out portions being edited while the machining program is subjected to editing, such as writing or deletion, a memory stored with the machining program may sometimes be in an incomplete state during the readout, so that an alarm, such as "incorrect checksum", is generated.

Furthermore, while some numerical controllers have the function of editing the machining program during the machining operation, this function is designed to copy the machining program used for the machining operation into a different memory space so that the copied machining program can be edited. In order to cause the result of the editing to be reflected in the machining operation, it is necessary co follow procedures such as to suspend the machining operation currently being performed, write the edited machining program back to an original memory space, and resume the machining operation. Consequently, this type of method has the problem that it cannot secure a satisfactory operational efficiency.

SUMMARY OF THE INVENTION

Accordingly, the object of the present invention is to provide a machining program editing device capable of editing a machining program being executed during a machining operation and of causing the result of the editing to be reflected in the machining program without suspending the machining operation.

According to the present invention, the above-described problems are solved by predicting an editable time before a block of a machining program is read out for execution so that the block can be edited during the editable time.

A machining program editing device according to the present invention is configured to control a machine based on a command from a block of a machining program and includes: a machining time prediction unit configured to predict, for each block of the machining program, a machining time based on the command of the block; a look-ahead block number calculation unit configured to calculate, for each block of the machining program, the number of blocks prefetched while the block is being executed; an editable time calculation unit configured to calculate an editable time for the block of the machining program; a program editing unit configured to display the machining program to accept a user's editing and write the result of the editing into a machining program used for the control; and an editable time display unit configured to display an editable time for a block being edited. The program editing unit makes editable only those of a plurality of blocks in the machining program which have the editable time left remaining and locally writes only edited portions into the machining program used for the control.

The editable time calculation unit may calculate, as the editable time, a time obtained by subtracting a preset allowance time from a time required for a specified block to be read out for execution from the present point in time.

According to the present invention, a machining program can be edited without suspending a machining operation by a controller during the machining operation and the result of the editing can be immediately reflected in the operation, so that there is no loss time due to suspension of the machining operation, and therefore, tasks can be performed efficiently.

BRIEF DESCRIPTION OF THE DRAWINGS

FIG. 3 is a diagram illustrating a block information table; and

FIG. 4 is a diagram illustrating the relationships between a block of a machining program being executed, a specified block, and a range of blocks used to calculate an editable time.

DETAILED DESCRIPTION OF THE PREFERRED EMBODIMENTS

Figure 1:
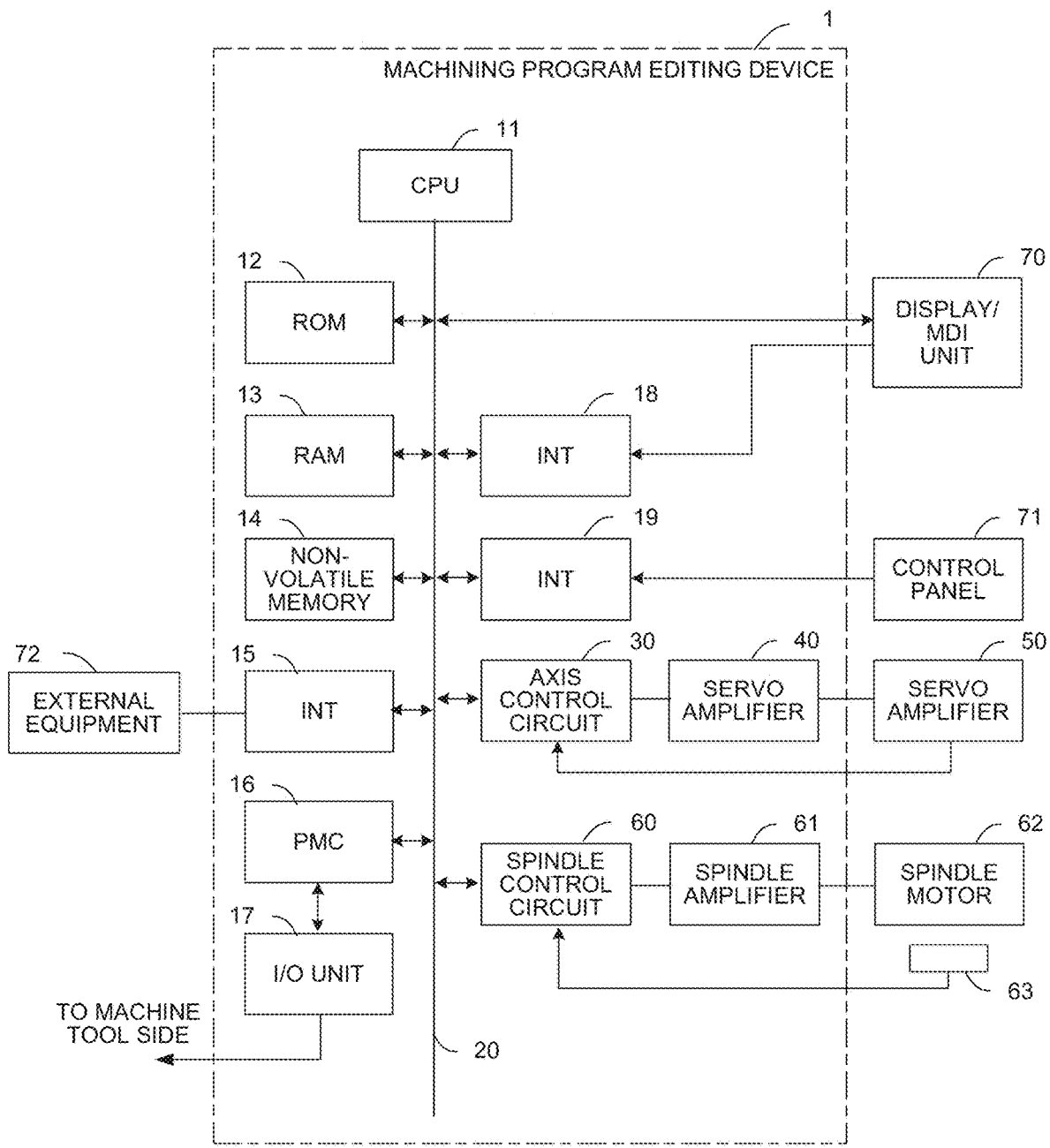
FIG. 1 is a schematic hardware configuration diagram of a machining program editing device according to one embodiment.

FIG. 1 is a schematic hardware configuration diagram showing principal parts of a machining program editing device according to one embodiment of the present invention. A machining program editing device 1 can be implemented as a controller for controlling a manufacturing machine such as a machine tool.

A CPU 11 of the machining program editing device 1 according to the present embodiment is a processor for generally controlling the machining program editing device 1. The CPU 11 reads out a system program in a ROM 12 via a bus 20 and controls the entire machining program editing device 1 according to this system program. A RAM 13 is temporarily stored with temporary calculation data and display data, various data input by an operator through an input unit (not shown), and the like.

A non-volatile memory 14 is constructed as a memory that is, for example, backed up by a battery (not shown) so that its storage state can be maintained even when the machining program editing device 1 is powered off. The non-volatile memory 14 is stored with machining programs read in from external equipment 72 through an interface 15 and input through a display/MDI unit 70 and various data (e.g., various signals indicative of the execution states of commands from the machining programs and the operating state of the machine tool, the positions, speeds, and current and voltage values of a servomotor 50 and a spindle motor 62, machining conditions, and tool and workpiece information) acquired from various parts of the machining program editing device 1, the machine tool, sensors, and the like. The machining programs and the various data stored in the non-volatile memory 14 may be developed in the RAM 13 during execution and use. Moreover, various system programs such as conventional analysis programs are previously written in the ROM 12.

The interface 15 is an interface for connecting the machining program editing device 1 and the external equipment 72, e.g., an adapter. Programs, various parameters, and the like are read in from the side of the external equipment 72. Moreover, the programs, the various parameters, and the like edited in the machining program editing device 1 can be stored into an external storage means through the external equipment 72. A programmable machine controller (PMC) 16 controls the machine tool and its peripheral devices (e.g., an actuator such as a robot hand for tool change and sensors installed on the machine tool) by outputting signals to them through an I/O unit 17 according to a sequence program incorporated in the machining program editing device 1. Furthermore, on receiving signals from various switches on a control panel on the main body of the machine tool and the peripheral devices, the PMC 16 processes these signals as required and then delivers them to the CPU 11.

The display/MDI unit 70 is a manual data input device equipped with a display, keyboard, and the like. An interface 18 receives commands and data from the keyboard of the display/MDI unit 70 and delivers them to the CPU 11. An interface 19 is connected to a control panel 71 equipped with a manual pulse generator and the like used to manually drive axes.

An axis control circuit 30 for controlling axes of the machine tool receives a movement command amount of each axis from the CPU 11 and outputs a command for the axis to a servo amplifier 40. On receiving this command, the servo amplifier 40 drives a servomotor 50 for moving the axis of the machine tool. The servomotor 50 for the axis has a position/speed detector built-in and feeds back a position/speed feedback signal from this position/speed detector to the axis control circuit 30, thereby performing position/speed feedback control.

In the hardware configuration diagram of FIG. 1, the axis control circuit 30, servo amplifier 40, and servomotor 50 are each shown as being only one in number. Actually, however, these elements are provided corresponding in number to the axes of the machine tool to be controlled.

A spindle control circuit 60 receives a spindle rotation command and outputs a spindle speed signal to a spindle amplifier 61. On receiving this spindle speed signal, the spindle amplifier 61 rotates a spindle motor 62 of the machine tool at a commanded rotational speed, thereby driving a tool. A position coder 63 is connected to the spindle motor 62. The position coder 63 outputs feedback pulses in synchronization with the rotation of a spindle and the feedback pulses are read by the CPU 11.

Figure 2:
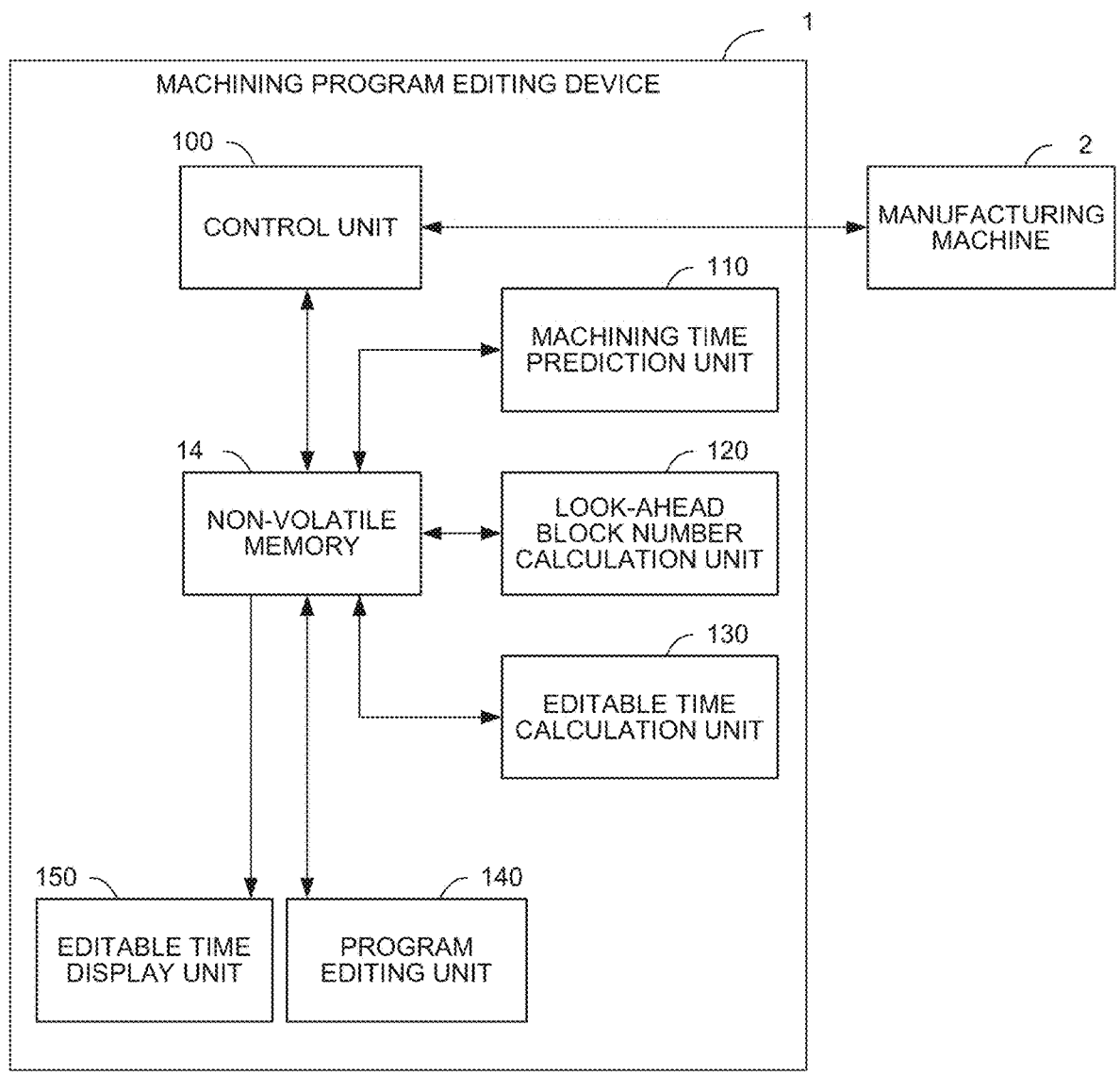
FIG. 2 is a schematic functional block diagram of the machining program editing device according to the one embodiment.

FIG. 2 is a schematic functional block diagram of the machining program editing device 1 according to the embodiment.

Functional blocks shown in FIG. 2 are implemented as the CPU 11 of the machining program editing device 1 shown in FIG. 1 executes their respective system programs and controls operations of various parts of the machining program editing device 1.

The machining program editing device 1 of the present embodiment comprises a control unit 100, machining time prediction unit 110, look-ahead block number calculation unit 120, editable time calculation unit 130, program editing unit 140, and editable time display unit 150. The control unit 100 controls a manufacturing machine 2 based on a machining program. The machining time prediction unit 110 predicts a machining time for each block of the machining program. The look-ahead block number calculation unit 120 calculates the number of blocks prefetched during the execution of each block of the machining program. The editable time calculation unit 130 calculates an editable time for the block of the machining program. The program editing unit 140 displays the machining program to accept a user's editing. The editable time display unit 150 displays the editable time for the block of the machining program.

The control unit 100 reads out a block of the machining program stored in the non-volatile memory 14 (or the machining program developed in the RAM 13) and controls the manufacturing machine 2 based on a command from the read block. The control unit 100 has a general function to control various parts of the manufacturing machine 2, e.g., to output an amount of movement for each control period to the servomotor 50 for driving an axis of the manufacturing machine 2 when the block of the machining program commands that axis to move or to output an output command to a peripheral device (not shown) attached to the manufacturing machine 2 when the block of the machining program commands that peripheral device to operate. The control unit 100 may be configured to write information capable of uniquely identifying the block of the machining program currently being executed into the non-volatile memory 14.

The machining time prediction unit 110 predicts the machining time for each block of the machining program by a conventional technique (e.g., Japanese Patent Application Laid-Open No. 2012-93975 or 2017-207823) for predicting the machining time of a block of a machining program and writes the predicted machining time for each block into a block information table on the non-volatile memory 14 (or the RAM 13). Since such technique for predicting a machining time of a block of a machining program is already well-known, a detailed description thereof is omitted herein.

FIG. 3 is a diagram showing an example of the block information table on the memory of the machining program editing device 1.

The block information table is a table that stores, for each block of the machining program, at least the machining time predicted by the machining time prediction unit 110 and the maximum number of look-ahead blocks calculated by the look-ahead block number calculation unit 120 in association with each other. On the block information table, each block of the machining program is managed so that it can be uniquely identified by, for example, the block number of the block or the like. Moreover, the block information table should preferably be managed so that its execution order can be ascertained for each block of the machining program (e.g., by analyzing a jump command or the like in advance). In such a case, the block information table may be designed to store information related to the blocks in the actual order of execution or managed in association with information on the execution order for each block.

The look-ahead block number calculation unit 120 calculates the maximum number of blocks prefetched in a look-ahead buffer during the execution of a command for each block of the machining program and writes the calculated maximum number of look-ahead blocks into the block information table on the non-volatile memory 14 (or the RAM 13). The maximum number of look-ahead blocks for a certain block is settled by commands of the block and blocks that have already been executed.

Normally, look-ahead blocks are several in number. If a mode for high-speed, high-precision machining is commanded, however, the number of look-ahead blocks is changed or considerably increased, for example, by the command. Moreover, if a command to suppress prefetching is issued, prefetching will not be performed for the commanded block and its subsequent blocks.

In order to calculate the number of blocks that have been prefetched by the time each block is executed, in an actual machining operation, it is necessary to consider time constraints, such as the time required for the readout of the program and the time required for the analysis of the program. In the look-ahead block number calculation unit 120, however, it is assumed that blocks of the maximum number of look-ahead blocks are prefetched based on the commands without considering these time constrains.

The processing for calculating the maximum number of look-ahead blocks for each block of the machining program by the look-ahead block number calculation unit 120 may be performed at the point in time when the machining program is selected or at any point in time during the machining operation according to the selected machining program. Preferably, however, the calculation processing should be performed in the background so that a worker is not conscious of this.

The editable time calculation unit 130 calculates the editable time for a specified block of the machining program based on the block currently being executed and the block information table. The editable time for the specified block calculated by the editable time calculation unit 130 is the time required for the specified block to be read out (or prefetched) for execution from the present point in time. A method for calculating the editable time for the specified block by the editable time calculation unit 130 will now be described with reference to FIG. 4.

FIG. 4 is a diagram illustrating the relationships between the block of the machining program being executed, the specified block, and the range of blocks in which the machining time is summed up.

When the block of the machining program is specified, the editable time calculation unit 130 identifies a block to be executed at the time when the block directly preceding the specified block is prefetched in the look-ahead buffer, with reference to the maximum number of look-ahead blocks for each block written in the block information table (Procedure 1).

If the specified block is N890, in the example of FIG. 4, it can be identified that a block N880 directly preceding the specified block is prefetched in the look-ahead buffer while a block N780 is being executed (since the maximum number of look-ahead blocks is 10). At this time, the blocks which have then been buffered in the look-ahead buffer are N790 to N880.

When the block to be executed at the time when the block directly preceding the specified block is prefetched in the look-ahead buffer is identified, the editable time calculation unit 130 uses the blocks ranging from the block currently being executed to the identified block as blocks for calculating the total machining time and calculates the total machining time as the editable time for the specified block. In the example of FIG. 4, the total machining time for the blocks N060 to N780 is calculated as the editable time for the specified block N890 (Procedure 2).

The editable time calculation unit 130 may also be configured to calculate the editable time shorter by a preset allowance time in order to complete editing with time to spare, without spending the time required for the specified block to be read out (or prefetched) for execution from the present point in time.

The program editing unit 140 displays the machining program to accept a user's editing. The program editing unit 140 may also be configured, in displaying the machining program on the display/MDI unit 70, to cause the editable time calculation unit 130 to calculate the editable time for each block as the specified block and to display those blocks with the editable time left remaining and those with no remaining editable time in a color-coded fashion, based on the calculated editable time for each block. Moreover, the program editing unit 140 may be configured to update the editable time for each block with every predetermined period or every completion of execution of each block, with the progress of the machining operation, and update the color-coded display of each block.

The program editing unit 140 accepts editing of the machining program based on the worker's editing operation on the display/MDI unit 70. Typical editing operations include a cursor movement and editing of characters in the cursor position. The program editing unit 140 causes contents edited based on the worker's operation to be reflected in the machining program stored in the non-volatile memory 14 (or developed in the RAM 13). When the program editing unit 140 causes the edited contents to be reflected in the machining program used for the machining operation, it does not write the entire machining program but locally writes only those portions (e.g., blocks) which are edited by the worker.

The program editing unit 140 may also be configured so that if the editable time for a block is up (or reduced to 0 or less) while the worker is editing that block, it displays a message to the effect without writing edited contents. In this case, the machining operation is continued and the contents edited by the worker are discarded. On the other hand, the program editing unit 140 may also be configured to stop the machining operation and cause the edited contents to be reflected in the machining program if the editable time for the block is up while the worker is editing that block. In this case, the program editing unit 140 may also be configured to ignore of the worker as to whether or not to stop the machining operation and cause the edited contents to be reflected in the machining program and to do so if it is permitted by the worker.

The editable time display unit 150 displays the editable time for the block of the machining program being edited. Typically, the editable time display unit 150 displays on a screen the editable time for the block (block in the cursor position) being edited by the program editing unit 140. The editable time display unit 150 may also be configured to update the display of the editable time for the block of the machining program being edited with every predetermined period, as a timer (not shown) built in the machining program editing device 1 advances or with the progress of the machining operation. Alternatively, the editable time display unit 150 may be configured to command the editable time calculation unit 130 to update the editable time for each block with every predetermined period, every completion of execution of each block, or every completion of execution of a predetermined number of blocks, with the progress of the machining operation. Moreover, the editable time display unit 150 may be configured to display a warning if the editable time for the block (block in the cursor position) being edited by the program editing unit 140 becomes shorter than a predetermined time.

While an embodiment of the present invention has been described herein, the invention is not limited to the above-described embodiment and may be suitably modified and embodied in various forms.

For example, in the embodiment described above, the machining program editing device is illustrated as being implemented as the controller. Alternatively, however, the machining program editing device 1 may be mounted on, for example, a personal computer adjoined to the controller or a computer, such as a cell computer or a host computer, connected to the controller through a wired or wireless network. In such a case, it is necessary only that the machining time prediction unit 110, look-ahead block number calculation unit 120, editable time calculation unit 130, program editing unit 140, and editable time display unit 150 be mounted on the personal computer or the computer and that the above-described processing be performed by exchanging data through communication between the controller and these functional means, or the like. If the machining program editing device 1 and the controller are constructed as two different devices, a time for communication or the like is required in order to cause the result of editing of the machining program to be reflected in the machining program being executed. Therefore, the time for the reflection should be measured in advance by an experiment or the like and previously set as an allowance time for the editable time calculated by the editable time calculation unit 130.

The invention claimed is:

1. A machining program editing device configured to control a machine based on a command from a block of a machining program, the machining program editing device comprising:
    a machining time prediction unit configured to predict, for each block of the machining program, a machining time based on the command of the block;
    a look-ahead block number calculation unit configured to calculate, for each block of the machining program, the number of blocks prefetched while the block is being executed;
    an editable time calculation unit configured to calculate an editable time for the block of the machining program;
    a program editing unit configured to display the machining program to accept a user's editing and write the result of the editing into a machining program used for the control; and
    an editable time display unit configured to display an editable time for a block being edited,
    wherein the program editing unit makes editable only those of a plurality of blocks in the machining program which have the editable time left remaining and locally writes only edited portions into the machining program used for the control.

2. The machining program editing device according to claim 1, wherein the editable time calculation unit calculates, as the editable time, a time obtained by subtracting a preset allowance time from a time required for a specified block to be read out for execution from the present point in time.

3. A machining program editing device configured to control a machine based on a command from a block of a machining program, the machining program editing device comprising:
    a display; and
    a processor configured to:
        predict, for each block of the machining program, a machining time based on the command of the block,
        calculate, for each block of the machining program, a number of blocks prefetched while the block is being executed,
        calculate an editable time for the block of the machining program, and
        cause the display to display the machining program to accept a user's editing and write the result of the editing into a machining program used for the control,
    wherein the display is configured to display an editable time for a block being edited, and
    wherein the processor is further configured to
        among a plurality of blocks in the machining program, make editable only those blocks which have the editable time left remaining, and
        locally write only edited portions into the machining program used for the control.

4. The machining program editing device according to claim 3, wherein the processor is further configured to calculate, as the editable time, a time obtained by subtracting a preset allowance time from a time required for a specified block to be read out for execution from the present point in time.

\* \* \* \* \*